(12) United States Patent
Boudreaux et al.

(10) Patent No.: US 8,576,700 B2
(45) Date of Patent: Nov. 5, 2013

(54) GEOGRAPHIC REDUNDANCY FOR CALL SERVERS IN A CELLULAR SYSTEM BASED ON A BEARER-INDEPENDENT CORE NETWORK

(75) Inventors: Paul Boudreaux, Plano, TX (US); Stephen Kolski, Plano, TX (US); Stewart Maxwell, Dallas, TX (US)

(73) Assignee: Rockstar Consortium US LP, Plano, TX (US)

( * ) Notice: Subject to any disclaimer, the term of this patent is extended or adjusted under 35 U.S.C. 154(b) by 189 days.

(21) Appl. No.: 13/180,045

(22) Filed: Jul. 11, 2011

(65) Prior Publication Data

US 2011/0261680 A1    Oct. 27, 2011

Related U.S. Application Data

(63) Continuation of application No. 12/463,634, filed on May 11, 2009, now Pat. No. 7,995,564, which is a continuation of application No. 10/615,260, filed on Jul. 8, 2003, now Pat. No. 7,532,568.

(60) Provisional application No. 60/394,632, filed on Jul. 9, 2002.

(51) Int. Cl.
*H04L 1/00*    (2006.01)
*H04L 12/26*    (2006.01)

(52) U.S. Cl.
USPC ............ 370/217; 370/218; 370/219; 370/220

(58) Field of Classification Search
None
See application file for complete search history.

(56) References Cited

U.S. PATENT DOCUMENTS

| | | | | |
|---|---|---|---|---|
| 5,675,723 A * | 10/1997 | Ekrot et al. | ..................... | 714/4.3 |
| 6,205,557 B1 * | 3/2001 | Chong et al. | ................... | 714/4.1 |
| 6,735,631 B1 * | 5/2004 | Oehrke et al. | ................ | 709/226 |
| 7,042,988 B2 * | 5/2006 | Juitt et al. | .................. | 379/88.17 |

* cited by examiner

*Primary Examiner* — Ayaz Sheikh
*Assistant Examiner* — Blanche Wong
(74) *Attorney, Agent, or Firm* — Christopher & Weisberg, P.A.

(57) ABSTRACT

In a bearer-independent core network, the switching and transport of the bearer streams is separated from the processing of call sessions that control the bearer streams. The switching and transport of the bearer streams is executed by media gateways and packet switches in the switching and transport layer of the network. The processing of calls sessions that control the bearer streams is executed by call servers in the call control layer of the network. The switching and transport layer of the network may be implemented using ATM or IP technology. In order to redirect the signaling links to a backup call server, a signaling gateway is used. Each media gateway includes a signaling gateway function. The signaling gateways redirect the signaling links by encapsulating each signaling message in a new packet in one embodiment.

10 Claims, 7 Drawing Sheets

GEOGRAPHIC REDUNDANCY FOR CALL SERVERS IN A CELLULAR SYSTEM BASED ON A BEARER-INDEPENDENT CORE NETWORK

CROSS REFERENCE TO RELATED APPLICATION

The present U.S. Utility patent application claims priority pursuant to 35 U.S.C. §120 as a continuation to the following U.S. Utility patent application, which is hereby incorporated herein by reference in its entirety and made part of the present U.S. Utility patent application for all purposes:

1. U.S. Utility application Ser. No. 12/463,634, entitled "Geographic Redundancy For Call Servers in a Cellular System based on a Bearer-Independent Core Network," filed May 11, 2009, pending, which claims priority pursuant to 35 U.S.C. §120, as a continuation, to the following U.S. Utility patent application, which is hereby incorporated herein by reference in its entirety and made part of the present U.S. Utility patent application for all purposes:

2. U.S. Utility application Ser. No. 10/615,260, entitled "Geographic Redundancy for Call Servers in a Cellular System based on a Bearer Independent Core Network," filed Jul. 8, 2003, now issued as U.S. Pat. No. 7,532,568, on May 12, 2009, that claims priority pursuant to 35 U.S.C. §119(e) to the following U.S. Provisional Patent Application, which is hereby incorporated herein by reference in its entirety and made part of the present U.S. Utility Patent Application for all purposes:

a. U.S. Provisional Application Ser. No. 60/394,632, filed Jul. 9, 2002, expired.

BACKGROUND

1. Technical Field

The present invention relates to communication networks and, more particularly, to wireless communication networks.

2. Related Art

Initially, communication systems, and more particularly, wireless communication systems, would route calls through the actual trunks that carry the calls. Stated differently, the trunks would be used to establish the link from the calling party to the called party without knowing the availability of the called party. The impact of this approach was that a trunk would be tied up for call routing purposes even if the call was not eventually connected. While the telephone resources would be released as soon as it was clear that the called party was not available, the wasteful allocation of resources for calls that could not be connected, in aggregate, resulted in significant inefficiencies.

Accordingly, telecommunication networks evolved to include signaling systems to facilitate the routing of call setup signals without having to tie up actual communication trunks. More generally, the purpose of a signaling system is to transfer control information between elements in a telecommunications network. The elements may comprise switches, operation centers and databases. For example, in some telecommunication networks, the elements comprise base station transceiver sets (BTSs), base station controllers (BSCs), mobile switching centers (MSCs), home location registers (HLRs), etc. Thus, signaling systems were originally developed to establish connections between telephone offices and the customer premises equipment (namely, the telephones) in order to transport voice traffic through a voice-oriented telephone network. To explain in simple terms, the signaling systems use a separate channel for conducting signaling control messages.

FIG. 1 shows a prior art signaling network. The signaling network, shown generally at 10, comprises BS 14 controlled by MSC 18 and BS 22 controlled by MSC 26. MSC 18 and MSC 26 communicate with home location (HLR) 30 through gateway MSC (G-MSC) 34 to access mobile station information to establish a communication link between mobile stations located within a service area served by BS 14 and BS 22 for establishing calls to and from mobile stations 38 and 42. Logically, MSC and G-MSC functions can be separated. In practice these are typically the same physical device that performs both functions within a mobile network.

In operation, a mobile station, such as mobile station 38, generates call setup signals through a BTS to a base station controller (BSC), collectively BS 14, in this example, which then generates calling signals to MSC 18. For the present example, assume that mobile station 38 is placing a call to mobile station 42. Neither BS 14 nor MSC 18 know what BS is serving mobile station 42 or what MSC is serving mobile station 42. Accordingly, MSC 18 produces call setup signals to a G-MSC 34 which queries a home location register (HLR) 30 to determine a location of mobile station 42. More specifically, HLR 30 returns an identifying MSC, which here is MSC 26, to G-MSC 34.

In some cellular networks, HLR 30 would merely communicate with the destination MSC as a part of the call setup procedures. Accordingly, in those embodiments, HLR 30 may communicate with MSC 26 to advise it that MSC 18 is attempting to establish a call to a mobile station served by MSC 26, as well as identifying information to enable MSCs 18 and 26 to communicate to setup the trunk for the voice traffic. In other networks, for example, in global systems for mobile communications (GSM) networks, the G-MSC, here G-MSC 34, communicates with HLR 30 to determine a destination MSC. Accordingly, in these embodiments, HLR 30 returns the identity of MSC 26 to G-MSC 34 which, in turn, forwards the response to MSC 18. The MSC 18 then communicates with MSC 26 to further set up the call. In the example shown, MSC 18 communicates with MSC 26 by way of G-MSC 34. Accordingly, the call connection may be established for a mobile station 38 through each of the communication elements to mobile station 42.

As the dual networks evolved for carrying user traffic and signaling traffic, the focus of many designs was to also provide redundancy, not only for the user traffic, but also for the signaling links. Thus, it is common to have a redundant signaling link, perhaps in a different cable bundle or, in a fiber optic ring, routed in an opposite direction, to provide an ability for control signaling to propagate through the network to establish a call despite a link or element failure. Heretofore, however, no geographically separated redundancy has been provided for the endpoints of the signaling network that carries the signaling traffic. More particularly, in phone networks, and especially in cellular phone networks, no geographically separated redundancy has been provided for the mobile switching centers and the gateway mobile switching centers.

Typically, the MSCs are consolidated at a switching center geographically distant from the cellular networks they control. One problem associated with consolidating the switching function is a geographically localized event, such as a tornado or other natural/man-made disaster will disrupt communications over a large area for any network element for which geographically separated redundancy is not provided.

The control or signaling network includes switching and transport of signaling streams and is separated from the processing of the call sessions that control the bearer streams. The switching and transport of the bearer streams is executed by media gateways and packet switches in the switching and transport layer of the network. The processing of call sessions that control the bearer streams is executed by call servers in the call control layer of the network. The switching and transport layer of the network typically uses asynchronous transfer mode (ATM) or Internet protocol (IP) technology.

One advantage of having bearer-independent core networks is that call servers can handle calls for media gateways that are distributed across a very large geographic area. One shortcoming of this approach, however, is that the risk resulting from the failure of a call server due to a power outage or natural disaster at the call server site, as mentioned above, affects communication services, and more particularly, wireless communication services, over a larger geographic area than the failure of a traditional cellular mobile switching center. Accordingly, what is needed is a call server that may be coupled and formed to act as a backup server in the event of a failure of a primary call server even if the backup call server is geographically dispersed from the primary call server.

SUMMARY

A signaling gateway is used to redirect signaling links from a primary call server to a backup call server in the event of a failure of the primary call server. The signaling gateway redirects signaling messages intended for the primary call server by encapsulating each signaling message in a new packet containing an address of a backup call server in one embodiment of the invention. In another embodiment of the invention, a mapping table is updated to automatically direct data packets to the backup call server. In either embodiment, the packet has the appropriate destination address of the backup call server when the primary call server is failed (inactive). For example, if a primary MSC or gateway-MSC (G-MSC) has failed, then the signaling gateways that form a ring around a network of MSCs and G-MSCs redirect portions of a primary signaling stream to backup call servers. One primary benefit of this technique is that it minimizes SS7 network disruption resulting from links being bounced. Another benefit is that SS7 peer addressing does not need reconfiguring when a geographically redundant call server fails. Generally, MSCs and G-MSCs are similar devices that, for the purpose of the described functions in a particular example, perform slightly different tasks during call setup. For example, the G-MSC is an MSC that communicates with an HLR to obtain location information for a mobile.

In one embodiment of the invention, one backup call server performs all backup functions for a primary call server. In an alternate embodiment of the invention, however, portions of the signaling links are directed to different backup call servers. From an external standpoint, meaning external to the signaling gateways, the change from a primary call server to a backup call server is transparent.

As stated before, in a bearer-independent core network, the switching and transport of the bearer streams is separated from the processing of call sessions that control the bearer streams. The switching and transport of the bearer streams is executed by media gateways and packet switches in the switching and transport layer of the network. The processing of calls sessions that control the bearer streams is executed by call servers in the call control layer of the network. In order to redirect the signaling links to a backup call server, however, a signaling gateway is used. Each media gateway often includes a signaling gateway function though the media and signaling gateway functions may be separated. In the described embodiments wherein a signaling gateway is described, such signaling gateway may be associated with or separated from the media gateway. The described embodiments primarily related to the signaling gateway functionality though the inventive concepts may also be employed with media gateways for media transport functions. The signaling gateways redirect the signaling links by encapsulating each signaling message in a new packet. The new packet has the address of the primary call server during normal conditions or the address of the backup call server when the primary call server has failed. Messages are encapsulated in a packet format defined by a packet based (such as an IP-based) signaling protocol. This enables the signaling messages to be routed between the call servers and signaling gateways over an IP network. When geographic redundancy is introduced into a network in this manner, each media gateway homed on the primary call server is assigned a backup call server. Every call server may act as both a primary call server and a backup call server in the described embodiments of the invention. Additionally, a call server may act as a backup call server for media gateways homed on (coupled proximately to) more than one primary call server. Each media gateway homed on a particular call server may be backed up by a different backup call server in order to distribute the impact of a failover condition over several call servers.

In one embodiment of the present invention, a plurality of signaling gateways form a network ring around a plurality of call servers to create geographic redundancy among the call servers there within. Each media gateway associated with a primary call server, or geographically coupled proximate to the primary call server, is assigned at least one backup call server. Within the ring of media gateways, every call server may act as both a primary call server and a backup call server in the described embodiment. Moreover, a call server may act as a backup call server for media gateways that are homed on more than one primary call server. Additionally, each media gateway homed on a particular call server may be backed up by a different backup call server in order to distribute the impact of a failover condition over several call servers.

Further, certain provisioned data in each primary call server is replicated in its backup call server to facilitate fast and seamless backup processing. This data replication may be performed by the operations, administration and maintenance system for the network. It may also be performed through any other known means to one of average skill in the art. In one embodiment of the invention, the replicated data for the primary call server to the backup call server includes translation data for routing calls, integrated services digital network user part (ISUP) routes, SS7 point codes, location area codes, media gateway inventory with an indication of active/inactive status, and signaling gateway inventory with an indication of active/inactive status for each.

Until an actual failover occurs, meaning that a signaling gateway fails to receive a "heartbeat" from the primary call server, this data is tagged as "inactive" in the backup call server. While tagged as "inactive", the backup call server does not use this data to process calls. Upon a specified error condition, for example, failure to receive a heartbeat, the associations within the media gateway of inactive are changed to active. Otherwise, the inactive associations from the backup call server's perspective will not cause alarms at the backup call server. When the fail over occurs, however, and the data is tagged as "active" in the backup call server, the backup call server immediately begins to utilize the data to process the calls. Accordingly, the backup call processing happens very quickly and is as seamless as possible.

DETAILED DESCRIPTION OF THE DRAWINGS

Figure 1:
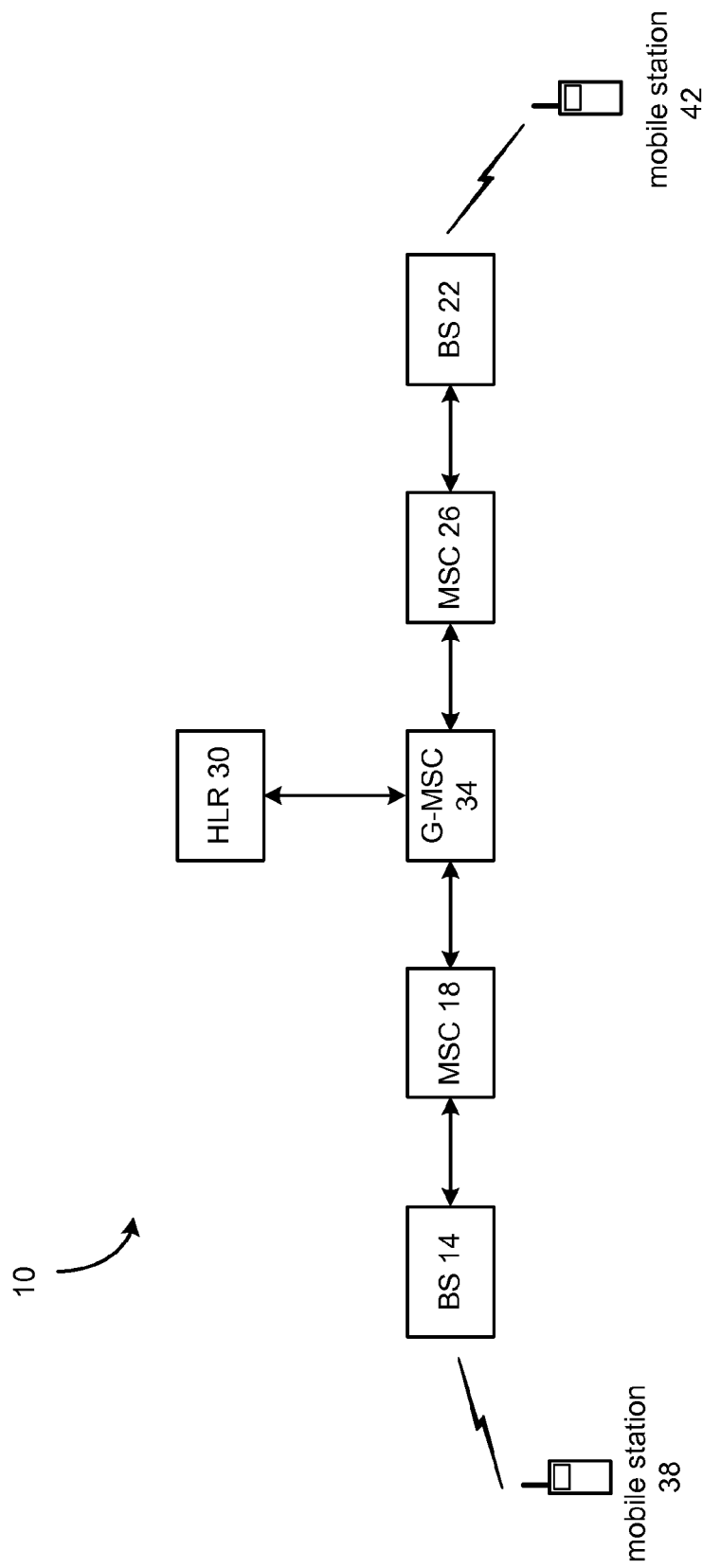
FIG. 1 shows a prior art signaling network.
Figure 2:
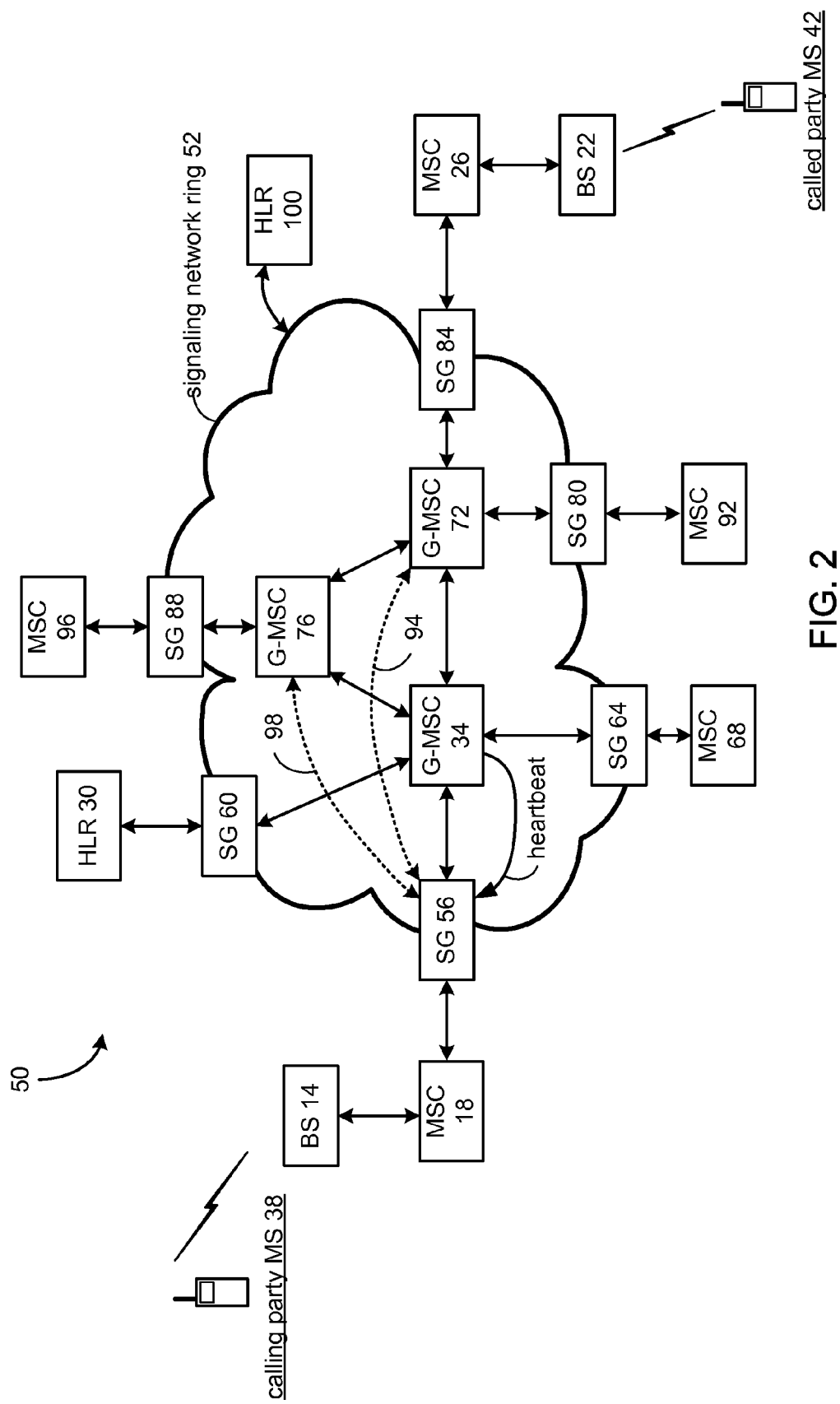
FIG. 2 is a functional block diagram of a communication network formed according to one embodiment of the present invention.

FIG. 2 is a functional block diagram of a communication network formed according to one embodiment of the present invention. A communication network 50 includes some of the elements and devices described with respect to FIG. 1, as well as the inventive network elements. As may be seen, a calling party mobile station 38 communicates with BS 14 which, in turn, communicates with MSC 18 for establishing a call to MSC 26, BS 22 and called party MS 42. Moreover, communication network 50 includes HLR 30 for providing the aforementioned location information. One difference, however, is the presence of signaling network ring 52. Signaling network ring 52 comprises a plurality of signaling gateways that are coupled between various call elements (or media gateways that transport user data including voice). For example, a signaling gateway 56 is coupled between MSC 18 and G-MSC 34. Contrasting this to the network of FIG. 1, MSC 18 and G-MSC 34 were coupled directly. Ideally, all media gateways are included within this ring 52 to provide maximum redundancy and, especially, geographic redundancy. As FIG. 2 illustrates, however, not all media gateways, for example, some that are already operating, may not be coupled to communicate with other media gateways by way of one or more signaling links. The backup geographic redundancy described herein, therefore, would not exist for these media gateways (MSCs in the described embodiment).

In general, for the example of FIG. 2, every network element for which backup is to be provided includes a proximately located signaling gateway. Moreover, a network element may proximately couple to a plurality of signaling gateways. As may be seen, G-MSC 34 is coupled to signaling gateway 56, as well as to signaling gateway 60 and signaling gateway 64. Signaling gateway 60 is proximately coupled to HLR 30, while signaling gateway 64 is proximately coupled to MSC 68. In the signaling communication network 50 of FIG. 2, G-MSC 72 is coupled to communicate with G-MSC 34, as well as to G-MSC 76. The G-MSC 76 also is coupled to G-MSC 34. Each G-MSC 34, 72 and 76 is operable as a primary call server, as well as a backup call server in the described embodiment. The G-MSC 72 is further coupled to a signaling gateway 80 and signaling gateway 84. The G-MSC 76 is coupled to a signaling gateway 88. Signaling gateway 80 is further coupled to an MSC 92, while signaling gateway 84 is coupled to MSC 26 and signaling gateway 88 is coupled to an MSC 96. Additionally, an HLR 100 is coupled to communicate with the signaling gateways of signaling network ring 52.

In operation, each of the signaling gateways receives a heartbeat signal that is produced by each of the G-MSCs of the network. Accordingly, G-MSC 34, 72 and 76 each produce a heartbeat to the signaling network ring 52. Upon failure of any one of the G-MSCs 34, 72 or 76, each of the signaling gateways is operable to perform specified backup data packet routing for the signaling network. For example, we will presume that G-MSC 34 has failed to produce its heartbeat signal within a specified window and it is therefore considered "inactive". As MSC 18 produces signaling messages, or data packets, containing an address of G-MSC 34 to signaling gateway 56, signaling gateway 56 will route the signaling messages, using backup signaling paths 98 and 94, to G-MSC 76 and G-MSC 72. Since G-MSC 76 and G-MSC 72 are operable as backup call servers to G-MSC 34, then signaling gateway 56 will, either by remapping the signaling messages to the designated backup call servers, or by adding new header address information to the signaling messages, route the signaling messages to the corresponding backup call server.

In the described embodiment of the invention, the primary call server, here G-MSC 34, is backed up by a plurality of G-MSCs or call servers, such as G-MSC 76 and G-MSC 72. It is understood that if the signaling network ring encompasses a greater number of call servers, then a greater number of call servers may operate as backup call servers for G-MSC 34. For the sake of simplicity, however, the present invention shows a signaling network ring that provides adaptive call routing for backup purposes for only three call servers, namely, G-MSC 34, G-MSC 72 and G-MSC 76. The designation as to what call server provides backup functionality is merely left to the system designer or system administrator of the network. As mentioned before, the routing of signaling messages to the backup call servers may be done either through a mapping scheme or by adding headers containing addresses of the backup call servers for the signaling messages. Both of these approaches are known by those of average skill in the art.

Continuing to examine communication network 50, in the situation where G-MSC 34 has failed to produce a heartbeat in a specified window of time, a plurality of external communication elements may originate signaling messages intended for G-MSC 34. For example, MSC 68, MSC 92, MSC 26 or MSC 96, may each have signaling messages intended for G-MSC 34. In one embodiment of the present invention, each backup call server processes a specified group of signaling messages for each of the MSCs. Each signaling gateway proximately coupled to a MSC is therefore provisioned to perform the specified backup call routing in the event of a failure of a specified G-MSC, such as G-MSC 34. In an alternate embodiment of the invention, each backup call server processes a specified type of signaling message. Accordingly, G-MSC 76 may provide backup call processing for first and second types of signaling messages, while G-MSC 72 provides backup call processing third, fourth and fifth types of signaling messages. As stated before, the specific implementations are function of system administration.

Figure 3:
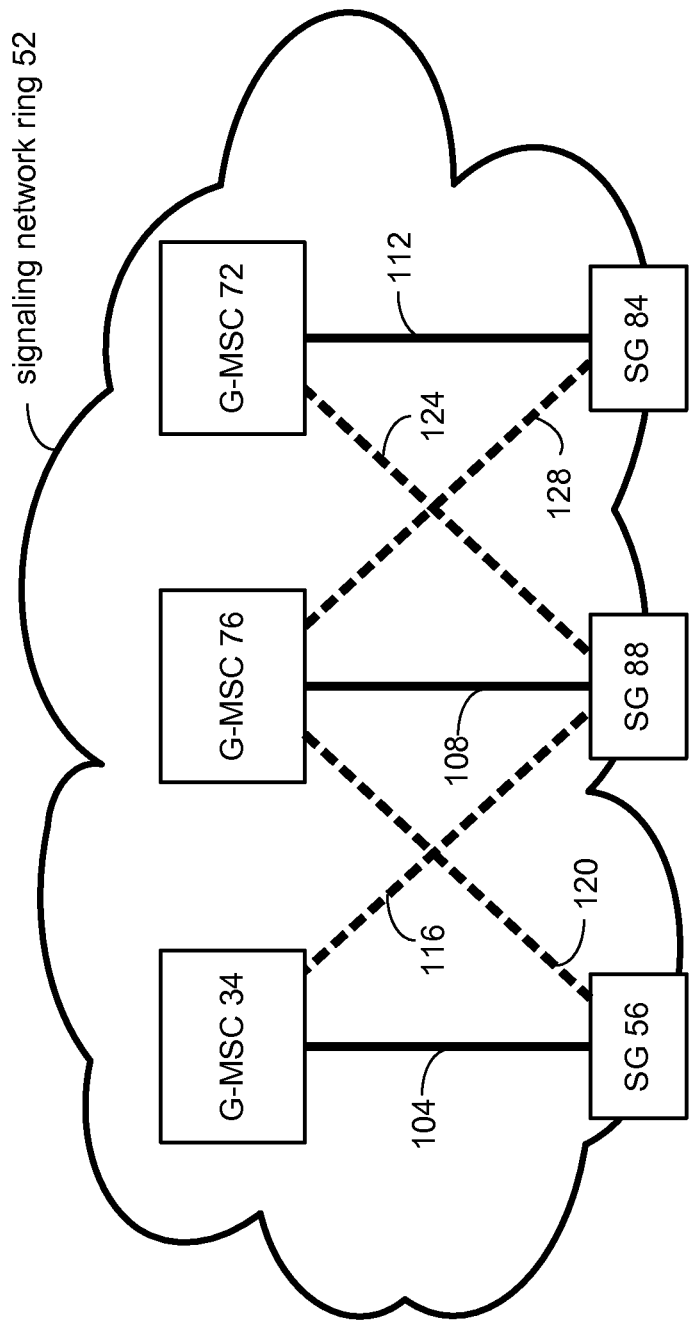
FIG. 3 is a functional block diagram illustrating the operation of a plurality of signaling elements and call servers within a signaling network ring according to one embodiment of the present invention.

FIG. 3 is a functional block diagram illustrating the operation of a plurality of signaling elements and call servers within a signaling network ring according to one embodiment of the present invention. More specifically, signaling network ring 52 comprises a plurality of signaling gateways as shown in FIG. 2. Here in FIG. 3, only a subset of those signaling gateways are shown. More specifically, signaling gateways 56, 88 and 84 are shown. As may be seen, each signaling gateway is coupled to a proximate call server, such as G-MSC 34, G-MSC 76 and G-MSC 72. Thus, signaling gateway 56 is directly coupled to G-MSC 34 by signaling path 104, while signaling gateway 88 is coupled to G-MSC 76 by signaling path 108 and signaling gateway 84 is coupled to G-MCS 72 by signaling path 112. In the embodiment of FIG. 3, a plurality of backup signaling paths are also shown. Thus, a backup signaling path 116 exists between G-MSC 34 and signaling gateway 88, while a backup signaling path 120 exists between signaling gateway 56 and G-MSC 76. Similarly, a backup signaling path 124 exists between G-MSC 72 and signaling gateway 88 and a backup signaling path 128 exists between signaling gateway 84 and G-MSC 76.

In operation, each signaling gateway is provisioned to perform specified backup routing to the corresponding backup call server. Thus, signaling gateway 56 will route, in the described example, signaling messages only to G-MSC 76 upon the failure of G-MSC 34. Signaling gateway 88, however, will route signaling messages to both G-MSC 34 and G-MSC 72 upon the failure of G-MSC 76. Signaling gateway 84, like signaling gateway 56, only routes signaling messages to one backup call server, namely, G-MSC 76. Accordingly, signaling gateway 84 will route signaling messages over backup signaling path 128 to G-MSC 76 upon the failure of G-MSC 72. As described before, each signaling gateway may be provisioned to route signaling messages to a corresponding backup call server by a system administrator in a desired manner. Moreover, the backup call routing may be done either through a mapping scheme or through a layered addressing scheme. The layered addressing scheme, in one embodiment, includes encapsulating a signaling message with a new header that contains the backup call server address.

Figure 4:
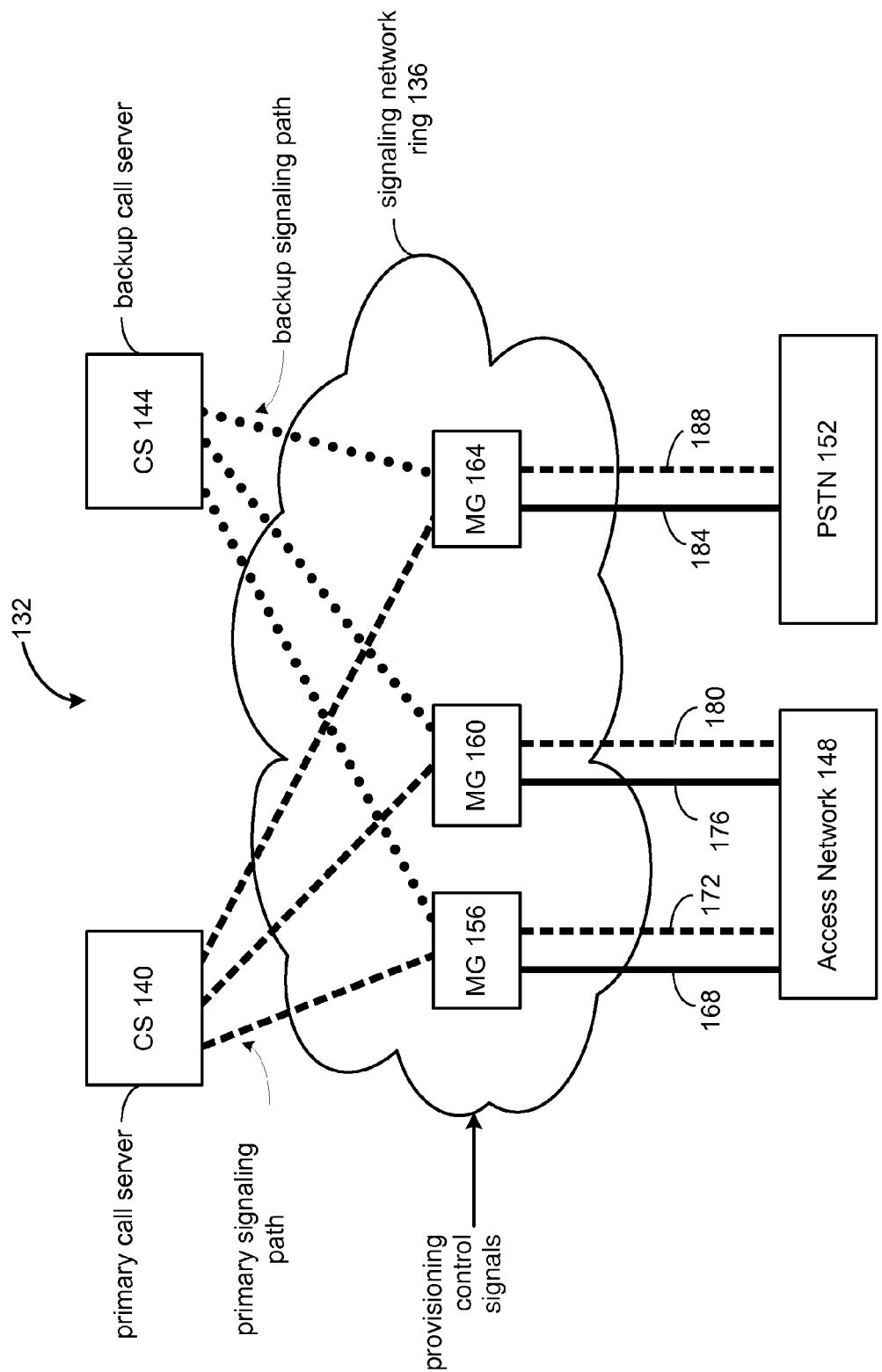
FIG. 4 is a functional block diagram illustrating one aspect of an embodiment of the present invention.

FIG. 4 is a functional block diagram illustrating one aspect of an embodiment of the present invention. A communication network 132 includes a signaling network ring 136 that is coupled between a plurality of call servers and a plurality of access points. For example, signaling network ring 136 is coupled between a primary call server 140 and a backup call server 144. Signaling network ring 136 is coupled to a plurality of access points, including those within an access network 148 and a public switched telephone network (PSTN) 152. Signaling network ring 136 includes, in the described example, three media gateways, namely, media gateways 156, 160 and 164.

The operation of the network of FIG. 4 is very functional in nature. As may be seen, a backup signaling path and a primary signaling path is coupled between each media gateway and an external access point. For example, media gateway 156 includes a bearer path 168 and a primary signaling path 172 that couple it to access network 148, and more particularly, to an access point within access network 148. Similarly, media gateway 160 is coupled to an access point within access network 148 by bearer path 176 and primary signaling path 180. Media gateway 164, on the other hand, is coupled to PSTN 152, and more specifically, to an access point comprising a switching element within PSTN 152, by bearer path 184 and primary signaling path 188. Each of the media gateways 156, 160 and 164, in the described embodiment, are coupled by a primary signaling path to primary call server 140 and to backup call server 144 by a backup signaling path. The primary and backup signaling paths between signaling network ring 136 and primary call server 140 and backup call server 144 comprises, in one embodiment of the invention, a data packet network signaling path that itself is very functional and is largely defined by the network type and corresponding addressing scheme. Accordingly, while the primary and backup signaling paths between the media gateways and the access points may be more dedicated in nature, the signaling paths between the media gateways and the call servers are more flexible and data packet oriented. Accordingly, as primary call server 140 fails to produce a specified heartbeat within a specified window, each of the media gateways 156, 160 and 164 will either through a mapping or addressing scheme, reroute signaling messages to backup call server 144.

FIG. 4 suggests that all backup processing by backup call server 144 may readily be rerouted to call server 140 once call server 140 has transitioned back to an active state. It is understood, however, that the system administrator may readily re-provision primary call processing of each call server 140 and 144 at any time, including when primary call server 140 transitions to an active state. As described before, backup call server 144 also, for other access points not shown here in FIG. 4, may serve as a primary call server. Accordingly, as each call server typically will operate as a primary and as a backup call server, the provisioning for each may readily be modified. Thus, the media gateways 156, 160 and 164 are formed to receive provision and control signals that specify primary and backup call routing. In the example of an embodiment utilizing mapping, a new table is produced including mapped relationships for primary and backup call processing. The new table specifies the new provisioning.

Figure 5:
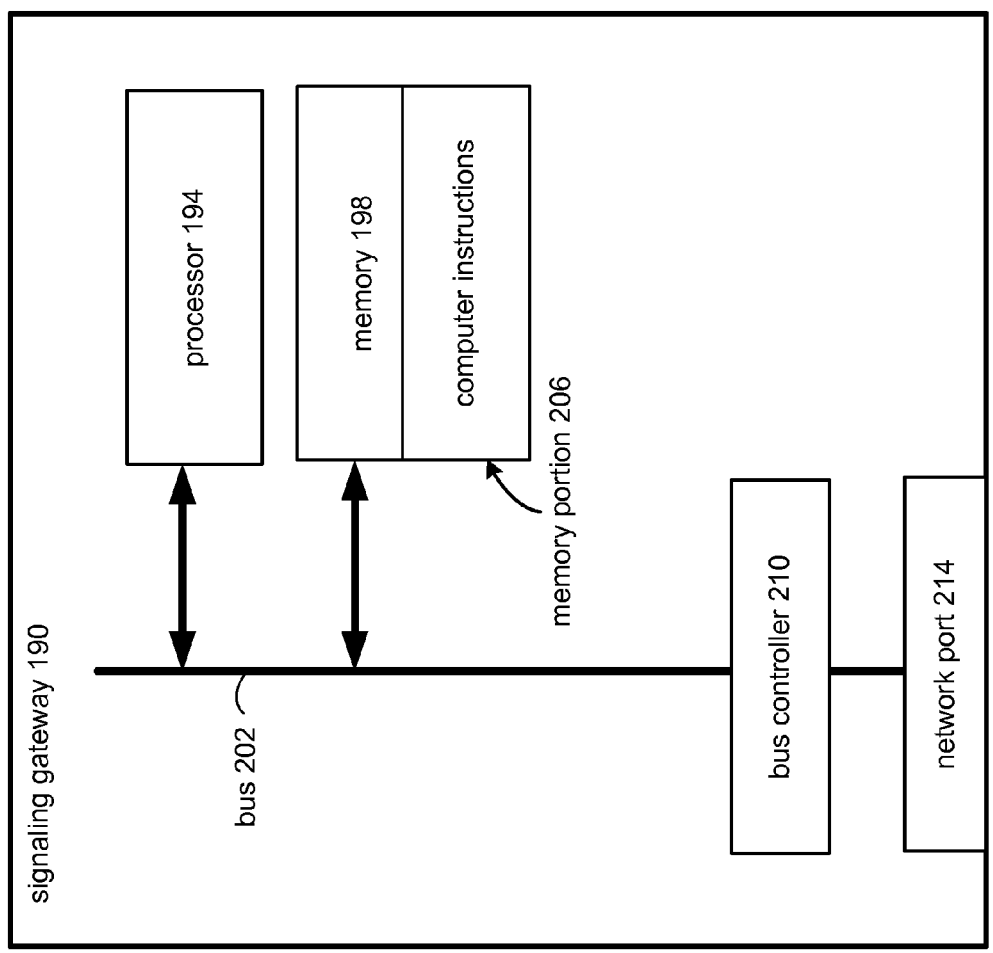
FIG. 5 is a functional block diagram of a signaling gateway formed according to one embodiment of the present invention.

FIG. 5 is a functional block diagram of a signaling gateway formed according to one embodiment of the present invention. Signaling gateway 190 includes a processor 194 that is operable to retrieve computer instructions from a memory 198 over a bus 202. Memory 198 includes a memory portion, shown generally at 206, that includes computer instructions that define operational logic of signaling gateway 190. Accordingly, when processor 194 retrieves the computers instructions stored within memory portion 206 by way of bus 202, processor 194 executes the retrieved computer instructions to cause signaling gateway 190 to operate according to the logic defined by the computer instructions stored within memory portion 206. Bus 202 further is coupled to a bus controller 210 which controls the communications thereon, as is known to one of average skill in the art. Bus controller 210 is further coupled to a network port 214 to enable processor 194 to communicate with external devices. It is understood, of course, that network port 214 is generic in nature and may represent a plurality of network ports for communicating over a plurality of different networks. Referring again to FIG. 4, for example, network port 214 generically represents the ports that communicate with bearer path 168 and primary signaling path 172, as well as the primary and backup signaling paths to primary and backup call servers 140 and 144, respectively.

Figure 6:
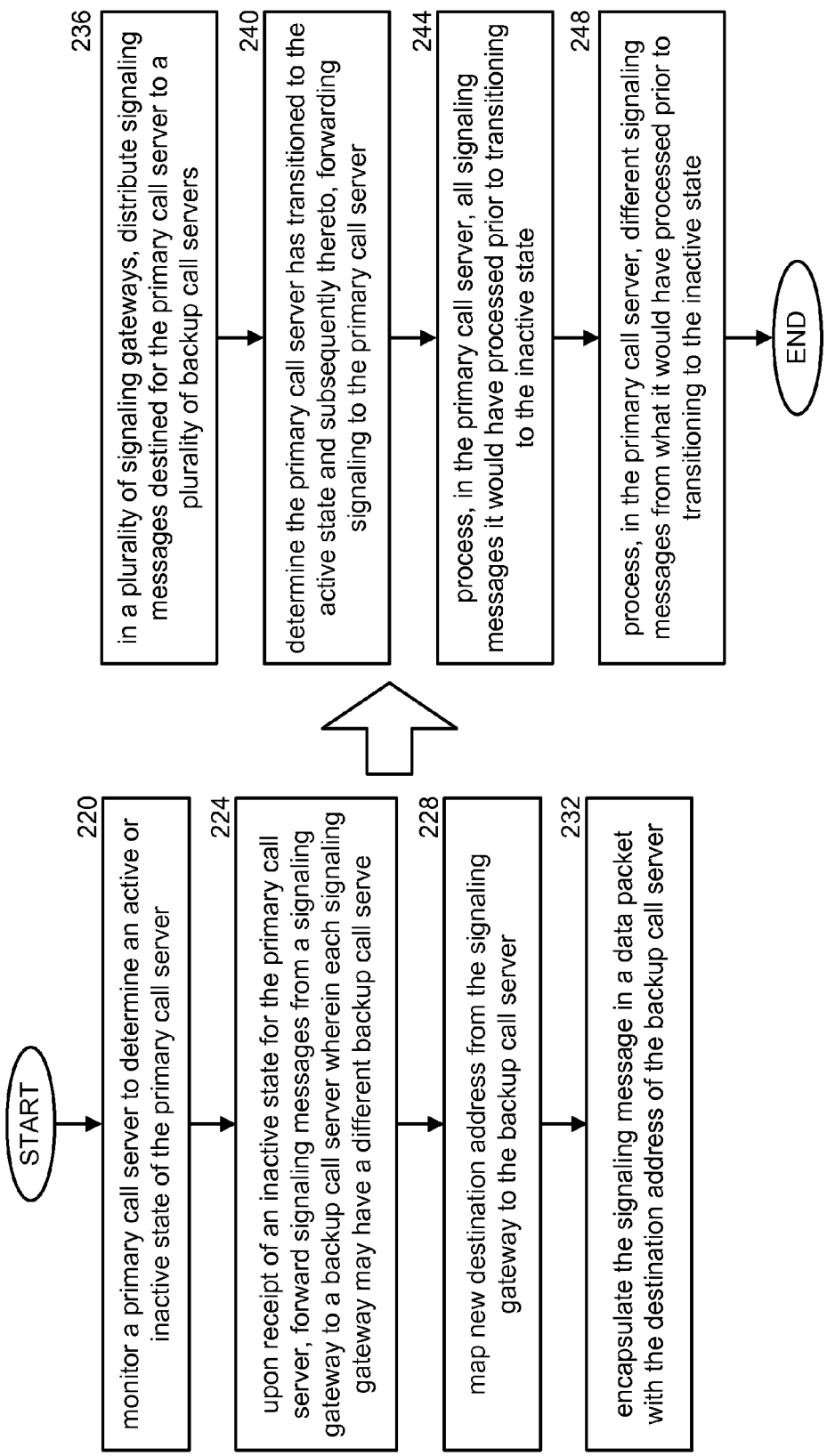
FIG. 6 is a flowchart that illustrates a method for transferring call control to a backup call server according to one embodiment of the present invention.

FIG. 6 is a flowchart that illustrates a method in a signaling gateway for transferring call control to a backup call server according to one embodiment of the present invention. Each call server couples a "heartbeat" signal to each signaling gateway in the signaling network ring to indicate the call server is active. The signaling gateway is coupled to a call server designated as primary and one or more call servers designated as backup call servers, wherein the primary and backup call servers comprise one of a MSC, a G-MSC, or a HLR. The signaling gateway monitors the primary call server to determine an active or inactive state of said primary call server (step 220). Upon receipt of an inactive state for the primary call server, the signaling gateway forwards signaling messages to the backup call server wherein each signaling gateway may have a different backup call server (step 224). Signaling messages include an address that routes it to the call server. The signaling gateway is pre-configured with a range of addresses that will, due to a loss of the heartbeat, forward the signaling messages to one or more call servers designated as backup call servers. Forwarding the signaling messages includes mapping new destination addresses from the signaling gateway to the backup call server (step 228). The signaling messages are forwarded to the backup server by encapsulating the signaling messages in a data packet with the destination address of the backup call server (step 232). Based on the encapsulated address, a plurality of signaling gateways distribute the signaling messages destined for the primary call server to a plurality of backup call servers (step 236).

When the primary call server transitions back to an active state, the heartbeat signal will be sensed by the plurality of signaling gateways. Once it is determined the primary call server has transitioned to the active state, the signaling messages are forwarded to the primary call server (step 240). In one embodiment, the primary call server processes all the signaling messages it would have processed prior to transitioning to the inactive state (step 244). In an alternate embodiment, the primary call server processes different signaling messages from what it would have processed prior to transitioning to the inactive state (step 248).

Figure 7:
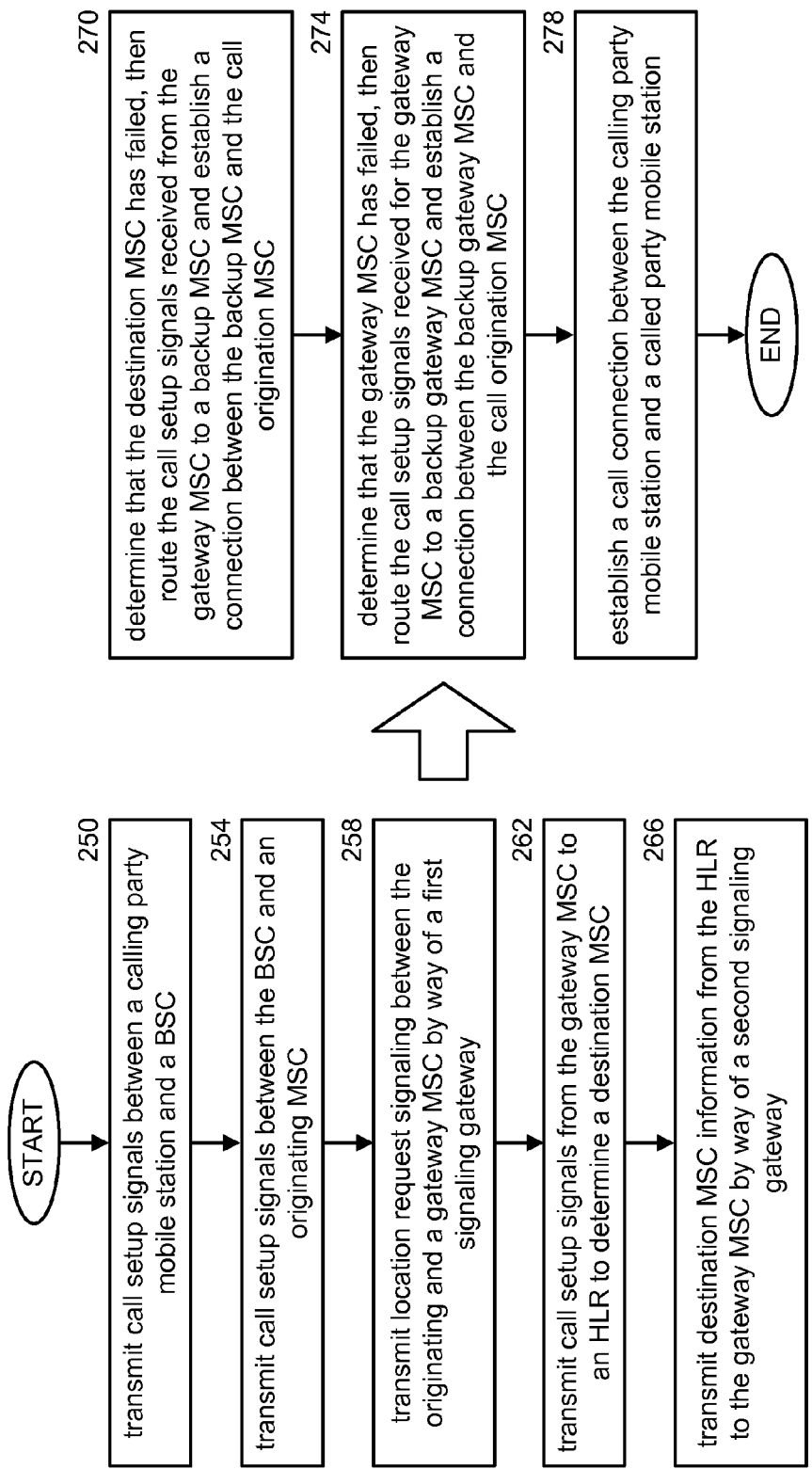
FIG. 7 is a flowchart that illustrates a method for transferring call control to a backup server according to the present invention.

FIG. 7 is a flowchart that illustrates a method for transferring call control to a backup server according to the present invention. Call setup signals are transmitted between a calling party mobile station and a BSC (step 250) and between the BSC and an originating MSC (step 254). The call setup signals are further transmitted between the originating MSC and a gateway MSC by way of a first signaling gateway (step 258). In order to determine the location of a called party mobile station, the call setup signals are further transmitted from the gateway MSC to an HLR, by way of a second signaling gateway to determine a destination MSC (step 262). The HLR maintains data for each mobile station registered with the network, including the controlling, or destination MSC. The destination MSC information is transmitted from the HLR to the gateway MSC by way of the second signaling gateway (step 266). When an MSC fails, the loss of the heartbeat signal is detected by the signaling gateways. Upon determining that the destination MSC has failed, the call setup signals received from the gateway MSC are routed to a backup MSC to establish a connection between the backup MSC and the originating MSC (step 270). Additional backup MSCs may be provided for redundancy or for providing back up functionality. Thus, if a second backup MSC is included, a first and second backup MSC provides additional redundancy according to selected backup function provisioning in the signaling gateways. Similarly, upon determining that the gateway MSC has failed, the call setup signals received for the gateway MSC are routed to a backup gateway MSC, a first backup gateway MSC, or a second backup gateway MSC to establish a connection between the backup gateway MSC and the originating MSC (step 274). Once the call setup signals have been sent, a call connection is established between the calling party mobile station and a called party mobile station (step 278).

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method of transferring call control to a backup call server, the method comprising:
   storing information identifying at least one backup call server for a primary call server;
   monitoring the primary call server to determine an active or inactive state of the primary call server;
   determining an inactive state for the primary call server;
   responsive to the inactive state determination, forwarding signaling messages from a signaling gateway to the at least one backup call server by encapsulating the signaling messages in at least one data packet having a destination address of the at least one backup call server based upon the stored information;
   replicating data of the primary call server in the at least one backup call server; and
   designating as inactive the replicated data in the at least one backup call server when the primary call server is in an active state.

2. The method of claim 1, wherein storing information comprises storing the information identifying at least one backup call server in a table identifying the at least one backup call server for the primary call server.

3. The method of claim 1, wherein monitoring the primary call server to determine an active or inactive state of the primary call server comprises monitoring the primary call server for a heartbeat signal.

4. The method of claim 3, wherein monitoring the primary call server for a heartbeat signal comprises monitoring for a heartbeat signal at the signaling gateway.

5. The method of claim 1, wherein determining the inactive state for the primary call server comprises determining loss of heartbeat from the primary call server.

6. The method of claim 1 wherein the primary call server comprises a call server selected from the group consisting of a Mobile Switching Center (MSC), a Gateway MSC (G-MSC), and a Home Location Register (HLR).

7. The method of claim 1, wherein the primary call server also functions as a backup call server, and the backup call server also functions as a primary call server.

8. A signaling gateway for coupling to a plurality of network elements, the signaling gateway comprising:
   at least one processor configured to execute processor-executable instructions causing the at least one processor to:
      store information identifying one or more backup network elements for each of a plurality of primary network elements; and
   store the processor-executable instructions that define operational logic of the signaling gateway, the processor-executable instructions further causing the at least one processor to:
   monitor a heartbeat signal from a first primary network element of the plurality of primary network elements;
   determine whether the first primary network element of the plurality of primary network elements is in an inactive state;
   when the first primary network element is in an inactive state, determine from the stored information identifying the one or more backup network elements, a first backup network element corresponding to the first primary network element;
   receive call signaling messages from a second primary network element of the plurality of primary network elements;

forward the call signaling messages to the first backup network element by encapsulating the call signaling messages in data packets with a destination address of the first backup network element;

monitor heartbeat signals from the first backup network element;

when the first backup network element is in an inactive state, determine from the stored information a second backup network element corresponding to the first primary network element; and forward the call signaling messages to the second backup network element by encapsulating the signaling messages in data packets with a destination address of the second backup network element.

9. A method of transferring call control to a backup call server, the method comprising:

storing information identifying at least one backup call server for a primary call server;

monitoring the primary call server to determine an active or inactive state of the primary call server;

determining an inactive state for the primary call server;

responsive to the inactive state determination, forwarding signaling messages from a signaling gateway to the at least one backup call server by encapsulating the signaling messages in at least one data packet having a destination address of the at least one backup call server based upon the stored information;

monitoring heartbeat signals from a first backup call server of the at least one backup call server;

when the first backup call server is in an inactive state, determining, from the stored information, another backup call server corresponding to the first backup call server; and forwarding the call signaling messages to the another backup call server by encapsulating the signaling messages in data packets with destination address of the another backup call server.

10. A method of transferring call control to a backup call server, the method comprising:

storing information identifying at least one backup call server for a primary call server;

monitoring the primary call server to determine an active or inactive state of the primary call server;

determining an inactive state for the primary call server;

responsive to the inactive state determination, forwarding signaling messages from a signaling gateway to the at least one backup call server by encapsulating the signaling messages in at least one data packet having a destination address of the at least one backup call server based upon the stored information;

replicating data of the primary call server in the at least one backup call server;

designating as active the replicated data in the at least one backup call server when the primary call server is in an inactive state.

* * * * *